US008789016B2

(12) United States Patent (10) Patent No.: US 8,789,016 B2
Eastham et al. (45) Date of Patent: Jul. 22, 2014

(54) SYSTEMS AND METHODS FOR PROVIDING USER CONFIGURABLE SOFTWARE LIBRARIES

(75) Inventors: W. Bryant Eastham, Draper, UT (US); James L. Simister, Pleasant Grove, UT (US)

(73) Assignee: Panasonic Corporation, Osaka (JP)

( * ) Notice: Subject to any disclaimer, the term of this patent is extended or adjusted under 35 U.S.C. 154(b) by 1766 days.

(21) Appl. No.: 11/321,712

(22) Filed: Dec. 29, 2005

(65) Prior Publication Data

US 2007/0157171 A1 Jul. 5, 2007

(51) Int. Cl.
G06F 9/44 (2006.01)

(52) U.S. Cl.
CPC .................................... *G06F 8/71* (2013.01)
USPC ........................................................ 717/121

(58) Field of Classification Search
CPC ........................................................ G06F 8/71
USPC ........................................................ 717/121
See application file for complete search history.

(56) References Cited

U.S. PATENT DOCUMENTS

| | | | | |
|---|---|---|---|---|
| 5,854,932 | A * | 12/1998 | Mariani et al. | 717/116 |
| 6,202,205 | B1 | 3/2001 | Saboff et al. | |
| 6,385,722 | B1 | 5/2002 | Connelly et al. | |
| 6,996,707 | B2 | 2/2006 | Liang et al. | |
| 2002/0184615 | A1* | 12/2002 | Sumner et al. | 717/130 |
| 2002/0198966 | A1 | 12/2002 | Jenkins | |
| 2003/0009750 | A1* | 1/2003 | Hundt et al. | 717/154 |
| 2003/0101432 | A1* | 5/2003 | Allison | 717/114 |
| 2003/0159133 | A1* | 8/2003 | Ferri et al. | 717/130 |
| 2004/0117771 | A1* | 6/2004 | Venkatapathy | 717/130 |
| 2005/0120340 | A1* | 6/2005 | Skazinski et al. | 717/140 |
| 2006/0020928 | A1* | 1/2006 | Holloway et al. | 717/136 |

OTHER PUBLICATIONS

Joseph Bergin, "Rules for C++ programmers", Feb 1998, http://web.archive.org/web/19980208221053/http://csis.pace.edu/~bergin/papers/cpprule.html.*
"Introduction to Aspect-Oriented Programming," Graham O'Regan, http://www.onjava.com/pub/a/onjava/2004/01/14/aop.html, Dec. 7, 2005.
"It's the Crosscutting," Gregor Kiczales, http://www.sdmagazine.com/documents/s=8993/sdm0402h/, Dec. 7, 2005.
Panagiotis C: "UNIX man pages: ar( )" GNU Development Tools, Jun. 9, 2001, pp. 1-5.
Guyer S Z et al.: "An annotation language for optimizing software libraries" Proceedings of the 2nd Conference on Domain Specific Languages, http://www.cs.tufts.edu/~sguyer/dsl99.pdf, Oct. 3, 1999, pp. 1-14.

* cited by examiner

*Primary Examiner* — Wei Zhen
*Assistant Examiner* — Lanny Ung
(74) *Attorney, Agent, or Firm* — Austin Rapp & Hardman

(57) ABSTRACT

A method for providing a configurable software library is disclosed. User input to specify target settings for at least one configurable settings of a base software library is received. The base software library is designed to be configurable. At least one code segment to be added to or removed from the base software library is identified based on the target settings. A modified software library is created by altering the base software library in accordance with the target settings in an automated manner utilizing a computer program. Systems for performing the foregoing method are also disclosed. The base and modified software libraries may be in a human-readable or computer-readable (binary) format. The disclosed systems and methods may be utilized to, for example, streamline a software library incorporated into or referenced by programming code.

18 Claims, 8 Drawing Sheets

SYSTEMS AND METHODS FOR PROVIDING USER CONFIGURABLE SOFTWARE LIBRARIES

TECHNICAL FIELD

The present invention relates generally to computers and computer-related technology. More specifically, the present invention relates to user configurable software libraries.

BACKGROUND

Computer and communication technologies continue to advance at a rapid pace. Indeed, computer and communication technologies are involved in many aspects of a person's day. For example, many devices being used today by consumers have a small computer inside of the device. These small computers come in varying sizes and degrees of sophistication. These small computers include everything from one microcontroller to a fully functional complete computer system. For example, these small computers may be a one-chip computer, such as a microcontroller, a one-board type of computer, such as a controller, a typical desktop computer, such as an IBM-PC compatible, etc.

Computers typically have one or more processors at the heart of the computer. The processor(s) usually are interconnected to different external inputs and outputs and function to manage the particular computer or device. For example, a processor in a thermostat may be connected to buttons used to select the temperature setting, to the furnace or air conditioner to change the temperature, and to temperature sensors to read and display the current temperature on a display.

Many appliances, devices, etc., include one or more small computers. For example, thermostats, furnaces, air conditioning systems, refrigerators, telephones, typewriters, automobiles, vending machines, and many different types of industrial equipment now typically have small computers, or processors, inside of them. Computer software runs the processors of these computers and instructs the processors how to carry out certain tasks. For example, the computer software running on a thermostat may cause an air conditioner to stop running when a particular temperature is reached or may cause a heater to turn on when needed.

One aspect of computer technology that is of great importance is software libraries. Software libraries are essentially pre-packaged programming code that a programmer can incorporate into a computer program at run time (dynamically linking a library) or when the program is compiled into machine-readable code (statically linking a library). Software libraries are valuable because they enable a user to create a software program in a rapid fashion. The programmer does not have to create every single algorithm used in a particular program.

Unfortunately, there are many problems with current software libraries. For example, software libraries are frequently distributed in a "black box" format such that the programmer does not understand how the algorithm in the library is performing the task at hand. As a result, the programmer may not fully understand the limitations or the capabilities of the algorithm in the library.

Furthermore, libraries typically cannot be modified. As a result, the programmer is forced to utilize the functions as they are in the library. The programmer cannot customize the library to suit a particular situation. This can create significant problems and limitations in certain circumstances. For example, when programming for embedded devices, which often have significant memory and processing limitations, programmers are properly concerned about the size of a particular function utilized by a program. Functions from libraries that are significant in size simply cannot be utilized with embedded devices, although these functions may contain many code segments that are simply unnecessary for the programming task at hand. However, because the programmer cannot alter, adopt, or even view the programming code in the library, the algorithms cannot be used for many programming tasks.

In addition, when software libraries are distributed and are editable, significant problems can be created when newer versions of libraries are distributed. For example, when version 1 of a software library has been edited by a user, it can be almost impossible, or at least very time-consuming, to incorporate the changes or adaptations made to version 1 into version 2 of the software library.

Accordingly, benefits may be realized by improved systems and methods for user configuration of software libraries. Some exemplary systems and methods for configurable software libraries are described herein.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
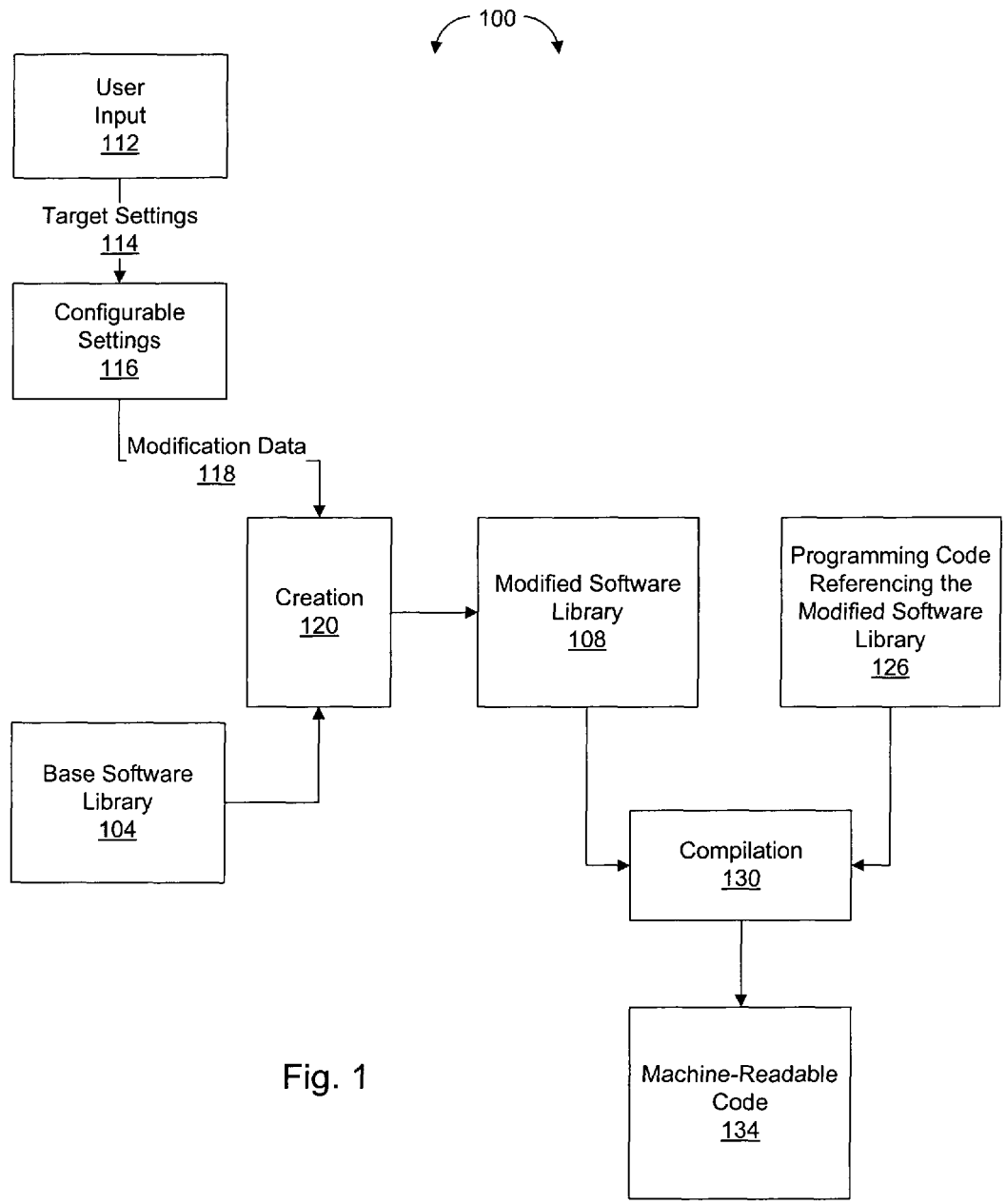
FIG. 1 is a block diagram illustrating one embodiment a system for providing a configurable software library.

A method for providing a configurable software library is disclosed. User input to specify a target setting for at least one configurable setting of a base software library along with a desired target language for comments is received. The base software library is designed to be configurable and comprises human-readable programming code. At least one code segment to be added to or removed from the base software library based on the target setting and the desired target language for the comments is identified. A modified software library is created by altering the base software library in accordance with the target settings in an automated manner utilizing a computer program. The comments in the modified software library are in the desired target language. The modified software library may comprise human-readable programming code.

The method may further comprise determining the configurable settings of the base software library. Also, the base software library may be derived from a first software library. In one embodiment, the base and modified software libraries may comprise programming code for an embedded device. The target setting may be configured to remove at least one code segment from the base software library to create the modified software library.

The target setting may be configured to add at least one code segment to the base software library to create the modified software library. The added code segment may comprise, for example, a call to an external software library or code segment that defines constants for use in the modified software library.

A computer system for performing the foregoing methods is also disclosed. The system may include a processor; memory in electronic communication with the processor; and instructions stored in the memory for executing the foregoing methods. A computer-readable medium including instructions for performing the foregoing methods is also disclosed.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the term "computing device" refers to any type of electronic device having a processor, which typically performs arithmetic or logical operations. The computing device may include memory (e.g., random access memory (RAM)), flash memory, and/or a hard disk storage device). The computing device may process instructions stored in memory. A computing device may optionally include other components, such as communication interfaces (e.g., a network card or modem) for communicating with other devices, inputs for receiving user input (e.g., a keyboard, touchpad, or mouse) or outputs (e.g., audio outputs or a display screen) for providing information to a user. Additionally, it should be noted that a computing device may be embodied as different types of devices, such as a desktop computer, server, tablet PC, notebook computer, personal data assistant (PDA), cellular phone, or embedded device.

FIG. 1 is a block diagram illustrating an embodiment of a system 100 for providing a user configurable software library. In the illustrated embodiment, the user configurable software library is shown as the "base software library" 104. The base software library 104 may be embodied in various ways. For example, the base software library 104 may comprise source or human-readable code. Alternatively, the base software library 104 could comprise binary or machine-readable code.

The base software library 104 is designed to be configurable and may include or be linked to settings or programming controls for editing aspects of the base software library 104. The base software library 104 may be altered by a user to create a new or modified software library 108. In one embodiment, the base software library 104 is distributed in a read-only format such that its contents may be viewed but not edited. In such an embodiment, a library user may modify the base software library 104 only by creating a new, modified software library 108.

The disclosed system 100 further includes a user input component 112 for receiving user input and generating target settings 114 for configuration of the base software library 104. The target settings 114 control creation of the modified software library 108 utilizing the base software library 104. User input may be received in numerous ways by the user input component 112. For example, user input may comprise a file formulated to control the configurable settings of the base software library 104. Alternatively, the target settings 114 may be generated in response to user interaction with a display screen or other user interface device. Target settings 114 generated by the user input component 112 are received at the configurable settings component 116.

The system 100 also includes a configurable settings component 116. The configurable settings component 116 determines (i.e., identifies) which aspects of the base software library 104 are configurable. Determination of the configurable aspects of the base software library 104 may be performed in a number of different ways. For example, a data file or compilation including such configuration information may be accessed. The data compilation may be internal or external to the base software library 104. As another example, the base software library 104 may be analyzed to identify pertinent metadata, keywords, or switches to identify which aspects of the base library 104 are configurable. The configurable settings component 116 may also determine the location of specific code segments or areas of the programming code of the base software library 104 to be altered by, for example, line number or byte offset.

The configurable settings component 116 may, in one embodiment, communicate with the user input component 112 to indicate to a user which settings can be configured via, for example, a display device. The user input and configurable settings components 112, 116 may be integrated with the base software library 104 or may be discrete programs from each other 112, 116 and from the base software library 104.

Many different aspects of the base software library 104 may be user configurable. As an example, the base software library 104 could comprise a library of functions for enabling communication between two electronic devices. In this case, the configurable settings could control the number of allowable communication sockets for the software to be created.

In response to receipt of target settings 114, the configurable settings component 116 generates modification data 118. The modification data 118 may identify code segments (e.g., programming code or comments in the code) that may be added to or removed from the base software library 104. The modification data 118 may be embodied in various ways. The modification data 118 could identify code segments to be removed, for example, by identifying a range of line numbers to be deleted. Alternatively, the modification data 118 could identify specific code segments to be inserted at a specific byte offset within the base software library 104. In addition, the modification data 118 could identify code segments associated with particular metadata, tags, or switches within the base software library 104 for removal. The modification data 118 may also include code segments (in either textual or binary form) for inclusion in the modified software library 108. The code segments to be added may be generated by the configurable settings component 116 or may be received directly from a user by the user input component 112.

A creation component 120 utilizes the base software library 104 to create a modified software library 108 in accordance with the modification data 118. The modified software library 108 is a modified version of the base software library 104 specifically tailored to the project for which the modified software library 108 was created. The modified software library 108 may comprise human- or machine-readable programming code.

After creation of the modified software library 108, programming code 126 that references the modified software library 108 may be compiled using a compilation component 130 to create machine-readable code 134. The modified software library 108 may be dynamically or statically linked to the machine-readable code.

The disclosed system 100 provides substantial advantages over conventional systems. First, a user is not compelled to utilize the base software library 104 in compiling code. The user can tailor the library 104 to suit specific needs of the programming task at hand. For example, a programmer can remove unnecessary code from the base software library 104 to streamline the machine-readable code 134 created. A user is not required to include a wide number of algorithms and functions that simply will not be used in the machine-readable code 134. This can be very important, particularly when the machine-readable code 134 is to be utilized with an embedded device, which typically has a limited amount of memory and processing power.

Second, the integrity of the base software library 104 is preserved. In one embodiment, the base software library may be distributed in a read-only format such that it can be viewed but not modified by a programmer. Furthermore, the creator of the base software library 104, in one embodiment, can control which aspects of the base software library 104 may be modified by end-users to create a modified software library 108. In addition, in one embodiment, a user may be permitted to view the code of the base software library 104 to understand precisely the procedures utilized therein. The ability to view programming code within the base software library 104 enables library users to better understand the algorithm being performed and whether it is well suited to the programming task at hand.

Third, modification of the base software library 104 can be expedited by simply selecting user configurable settings. By changing a few simple user configurable settings, massive and significant changes to the base software library may be rapidly made. Accordingly, tweaks or changes to the base software library 104 can easily be replicated if the code for the base software library 104 is improved or otherwise modified.

Figure 2:
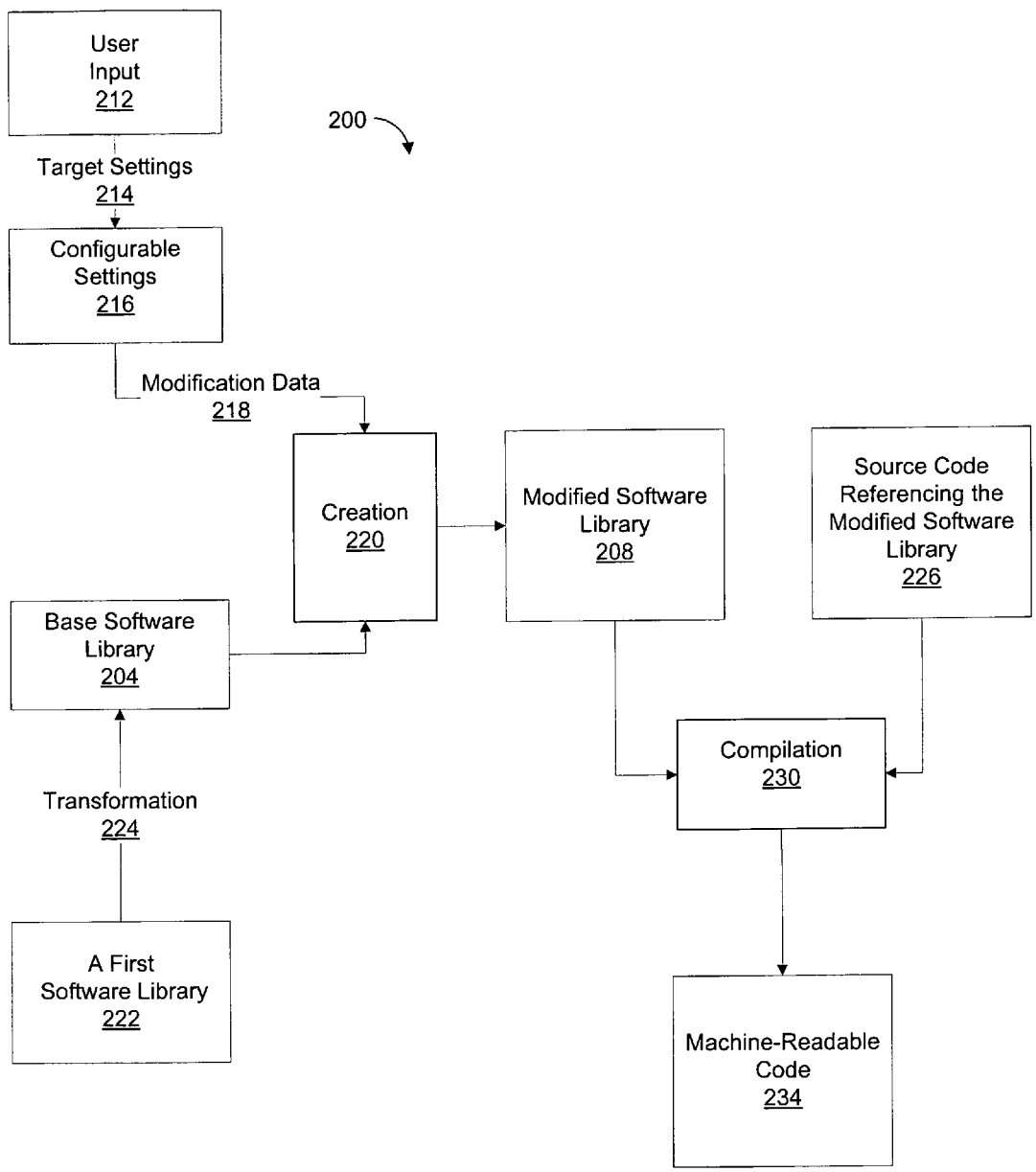
FIG. 2 is a block diagram illustrating an alternative embodiment of a system for providing a user configurable software library.

FIG. 2 is a block diagram illustrating an alternative embodiment of a system 200 for providing a user configurable software library 204. This system 200 functions in a manner similar to the system 100 shown in FIG. 1. In particular, target settings 214 are transmitted from the user input component 212 to the configurable settings component 216. In response, modification data 218 is transmitted from the configurable settings component 216 to the creation component 220 to control creation of the modified software library 208.

However, in the embodiment shown in FIG. 2, a first software library 222 is transformed 224 into the base software library 204. In this case, the base software library 204 may be, for example, one or more dynamical link libraries (DLLs) created from the first software library 222 during the preliminary transformation process 224. As indicated above, the base software libraries 204 may comprise human- or machine-readable code. In one embodiment, the base software libraries 204, which have been created by the transformation process 224, may be distributed to library users such that the programming code for the base software library 204 is not revealed to or immediately visible to library users. Alternatively, the base software libraries 204 created by the transformation process 224 may also be formulated to provide a software library that is more user friendly or more easily accessible to library users.

As with the prior embodiment, the base software library 204 is utilized with the creation component 220 and the modification data 218 to create the modified software library 208. Further, the compilation component 230 may likewise be utilized to compile machine-readable code 234 utilizing the modified software library 208 and source code 226 referencing that library. Even though the base software library 204 may be distributed in a binary format, the visibility of the code may still be present in the modified software library 208. This gives the benefit of easy accessibility and user friendliness, without removing the benefits of being able to inspect the source of the library as is present in the modified software library 208.

FIGS. 3-6 disclose alternative embodiments of systems 300, 400, 500, 600 for providing configurable software libraries 304, 404, 504, 604. These alternative embodiments describe examples of types of modifications or transformations that may be performed on the base software library 304, 404, 504, 604. The examples disclosed therein are not limiting but merely illustrate types of modifications that may be performed utilizing the systems and methods disclosed herein.

In each of these systems 300, 400, 500, 600, as shown in FIGS. 1 and 2, a user input component 312, 412, 512, 612 generates target settings 314, 414, 514, 614 that are received by the configurable settings component 316, 416, 516, 616. In turn, the configurable settings component 316, 416, 516, 616 generates modification data 318, 418, 518, 618 that is received by the creation component 320, 420, 520, 620. The creation component 320, 420, 520, 620 then produces a modified software library 308, 408, 508, 608 based on the modification data 318, 418, 518, 618 and the base software library 304, 404, 504, 604. As illustrated in FIG. 2, the base software library 304, 404, 504, 604 could be derived from a first software library 222. For simplicity, programming code 226 referencing the modified software library 208, the compilation component 230, and the resultant machine-readable code 234 have been omitted from FIGS. 3-6.

Figure 3:
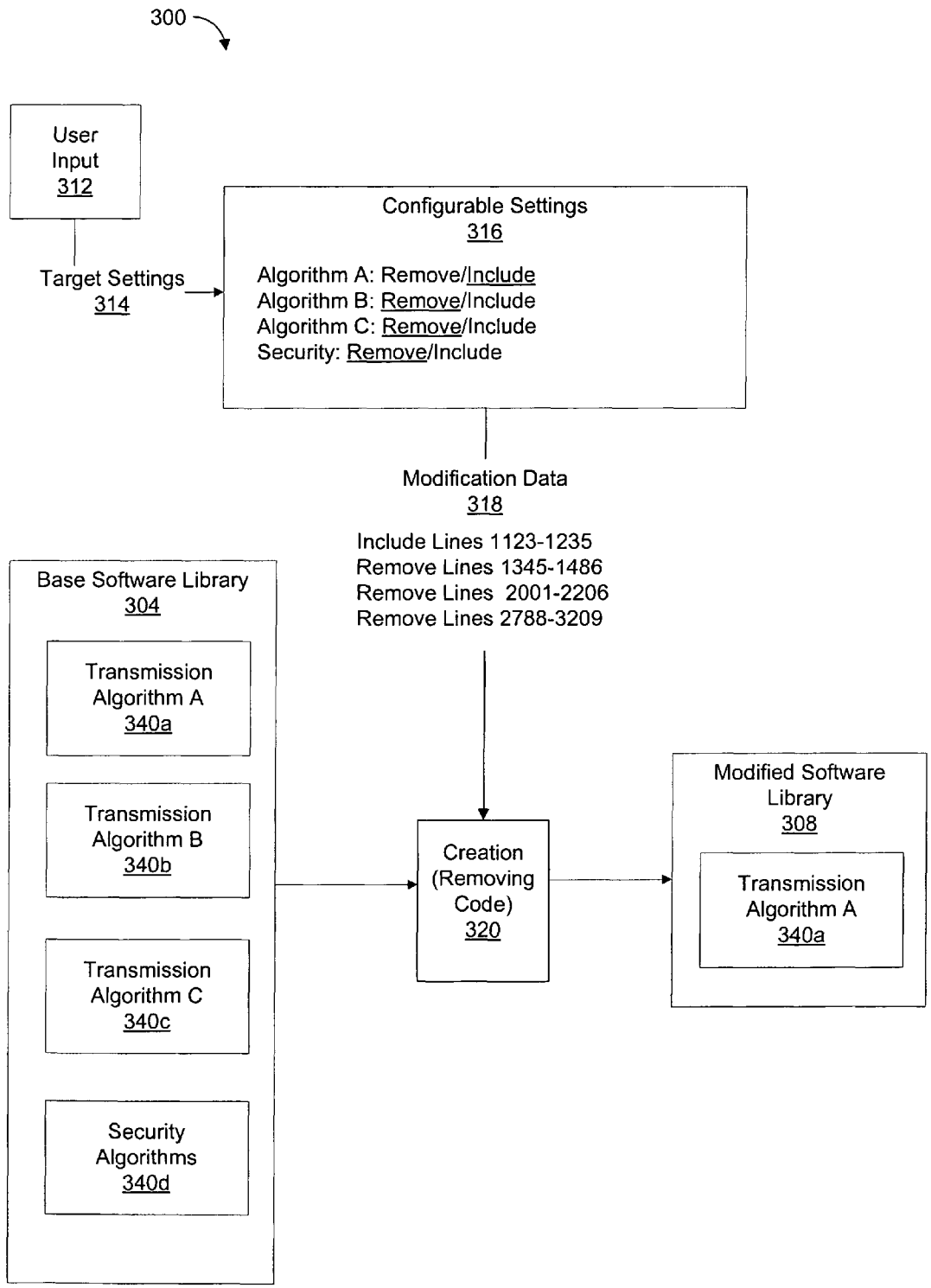
FIG. 3 is a block diagram of a system for providing a user configurable software library wherein code segments are removed from a base software library to produce a modified software library.

Specifically with reference to FIG. 3, a system 300 for creating a modified software library 308 from which specific code segments 340b-d have been removed from the base software library 304 is disclosed. In the embodiment shown in FIG. 3, the base software library includes four exemplary code segments 340a-d: transmission algorithm A 340a, transmission algorithm B 340b, transmission algorithm C 340c, and security algorithms 340d. The configurable settings of the illustrated embodiment include the ability to include or remove each one of these code segments.

In the illustrated system 300, target settings 314 specify that transmission algorithm A 340a be included in the modified software library 308, but that transmission algorithm B 340b, transmission algorithm C 340c, and the security algorithms 340d be removed from the modified library 308.

The resultant modification data 318 identifies specific lines of code to be included or removed from the base software library 304. In an alternative embodiment, only lines of code to be removed are identified in the modification data 318.

A system 300 for removing specific code segments from the base software library 304 may be embodied in various ways beyond the disclosed embodiment. The embodiment shown in FIG. 3 is merely one example of a way to achieve this utilizing the disclosed systems and methods. For example, the modification data 318 may be embodied in various ways to identify particular code segments. Code segments 340 may be identified, as examples only, by a byte offset, or by metadata, switches, tags, or keywords identifying the code segments. Further, it should be understood that transmission algorithm A 340a may include references to the other code segments 340b-d. The process of removing the other code segments may also involve removing these references or making other modifications to transmission algorithm A 340a.

Figure 4:
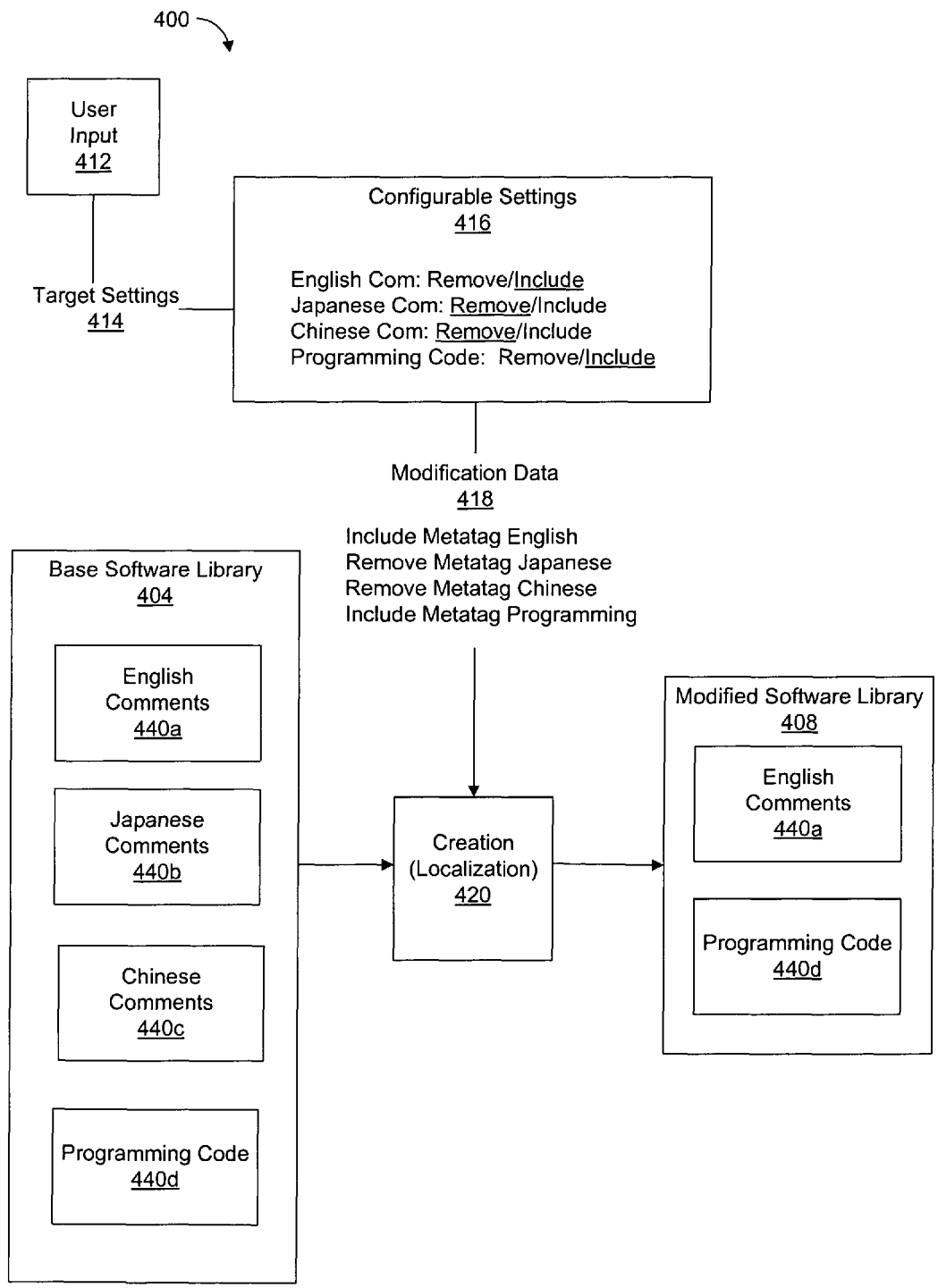
FIG. 4 is a block diagram of a system for providing a user configurable software library wherein programming comments of a specific language are removed from a base software library to produce a modified software library.

The system 400 shown in FIG. 4 specifically illustrates localization of the base software library 404. The base software library 404 includes programming comments 440a-c of various languages. In particular, it includes English comments 440a, Japanese comments 440b, and Chinese comments 440c. The base software library 404 further includes programming code 440d associated with the comments 440a-c.

As shown, the target settings 414 specify that the English comments 440a and the programming code 440d be included in the modified software library 408. The target settings 414 further specify that the Japanese comments 440b and Chinese comments 440c be excluded from the modified software library.

The modification data 418 references metatags within the base software library 404 that identify a particular code segment 440. As indicated, code segments 440 (for inclusion or exclusion) might be identified utilizing, for example, metatags, line numbers, or byte offsets.

The disclosed system 400 provides an efficient way for a user to remove comments of specific languages, which would merely encumber and make it difficult to understand functions defined by the modified software library 408. Of course, because software comments 440a-c are not incorporated into machine-readable code, the base software library 404 and the modified software library 408 would be in human-readable format in the illustrated embodiment.

The system disclosed in FIG. 4 is merely illustrative of one of the ways of localizing a base software library 404 utilizing the disclosed systems and methods. By way of example, the base software library 404 may include many different types of languages and comments from one or more of those languages may be included in the modified software library 408. In addition, the comments in a provided language, for example the English Comments 440a, could be translated to a new language using an accessible translation service, such as a translation service provided by Google of Mountain View, Calif., and incorporated into the modified software library. Further, the programming code 440d could potentially be translated to add a new language or have multiple language options included within the base software library 404. Of course, this translation may not be limited to comments only, but could potentially translate programming language identifiers and character strings that are part of the library, effectively enabling complete, automatic localization of a software library.

Figure 5:
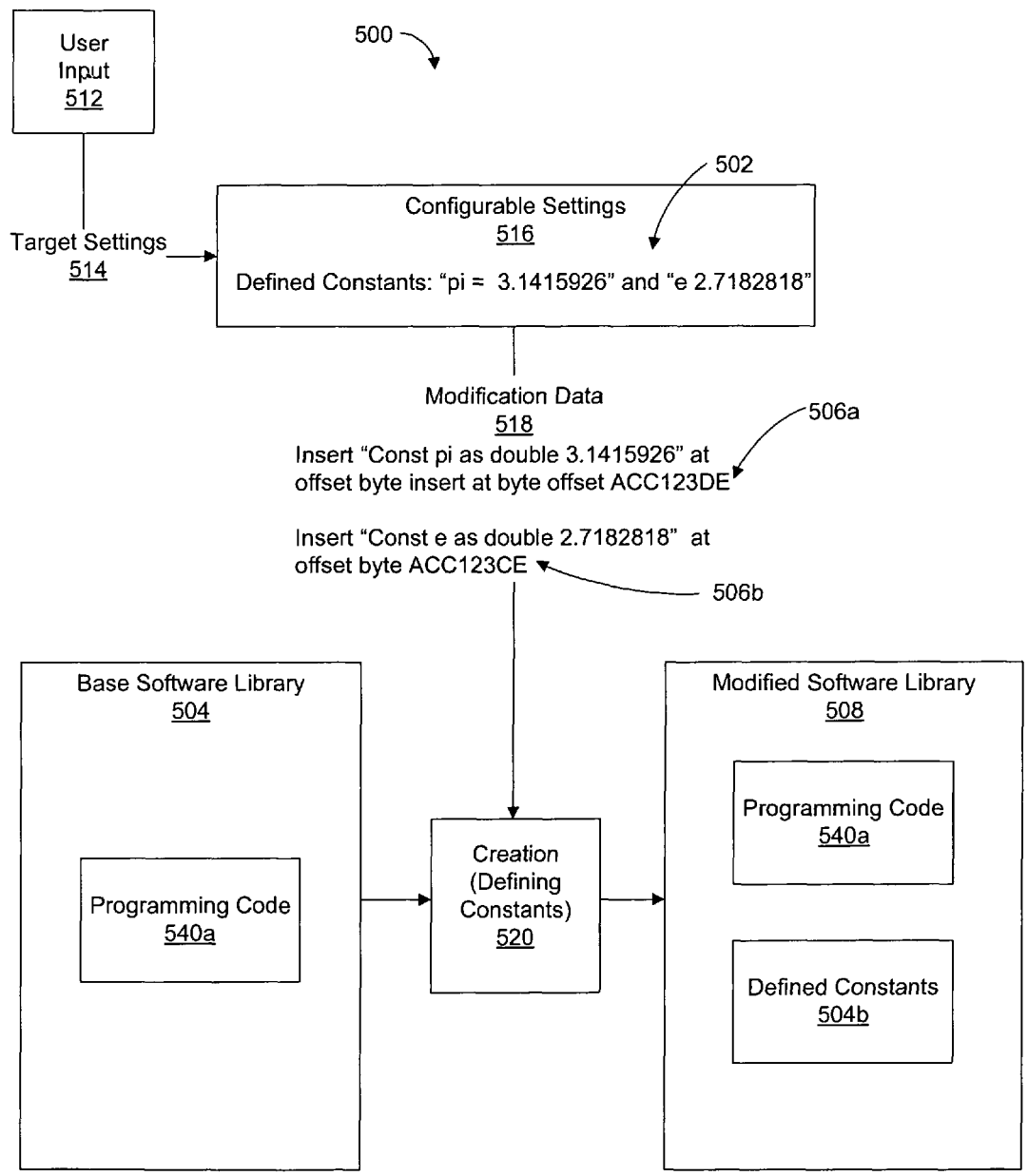
FIG. 5 is a block diagram of a system for providing a user configurable software library wherein constant definitions are inserted into a base software library to produce a modified software library.

In the system 500 shown in FIG. 5, the configurable settings component 516 receives target settings 514 defining the constants 502 ("variables" of constant value) generates modification data 518. In this case, the defined constants are "pi" and "e."

The constants 502 are to be inserted at a specific byte offset 506a-b from the appreciated beginning of a specified file within the base software library 504. Accordingly, the base software library 504 could be in binary form. If the base software library is in binary form, the inserted constants 502 would be converted into binary form by the configurable settings component 516 prior to insertion to the modified software library 508. The byte offset 506 could be determined by user input or by the configurable setting component 516.

The modified software library thus includes the programming code 540a found in the base software library 504, and also includes the constant definitions 540b created based on the user input 512.

Once again, the embodiment shown in FIG. 5 is merely illustrative of commands that may be inserted into the modified software library 508 utilizing the disclosed systems and methods. For example, many different types of constants could be defined, configuring code to create local or global variables or other programming commands or functions could be inserted into the modified software library 508.

Figure 6:
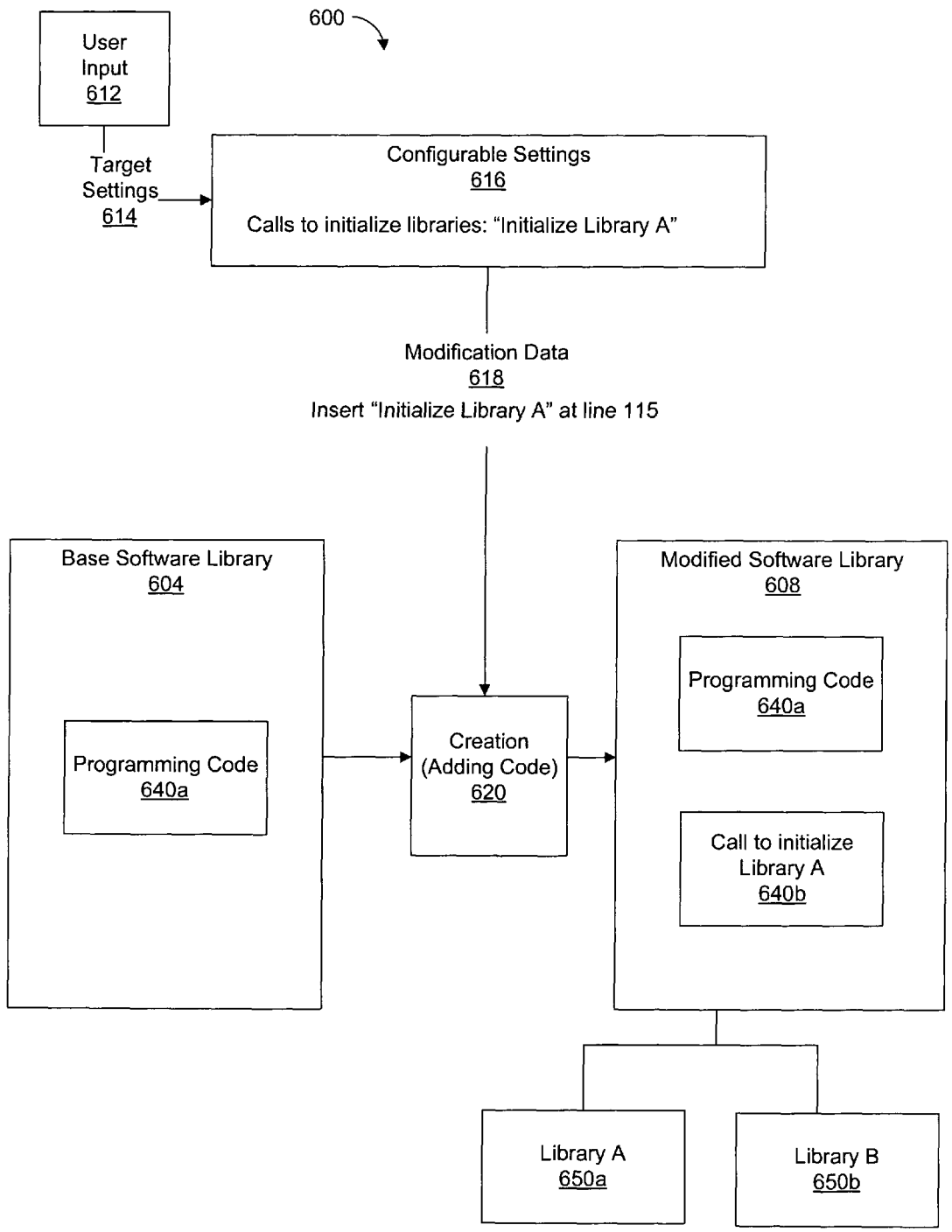
FIG. 6 is a block diagram of a system for providing a user configurable software library wherein calls to initialize external libraries are inserted into a base software library to produce a modified software library.

FIG. 6 illustrates a scenario where new code that was not part of the programming code 640a in the base software library 604 is added to a modified software library 608 to effectively add new code to a library that was not there originally. For example, when the producer wrote the base software library 604, the producer did not know what other libraries would be available to the end-user developer. However, when the end-user developer obtains the base software library 604, he or she will be aware of specific libraries 650a-b that are available on the end-user system or target. With the present systems and methods, the end-user developer will then be able to add new code to the base software library 604 that interacts with the specific libraries 650a-b. For example, he or she may add new code that initializes the specific libraries 650a-b. Alternatively, when the creation process is initiated by the creation component 620, other pertinent modules may be detected by the system 600. In such a case, the system 600 could create new code to initialize those modules and include that newly created code in the modified software library 608.

More specifically, in the system 600 shown in FIG. 6, receipt of the target settings 614 at the configurable settings component 616 triggers the creation of programming code for initializing an external software library, library A 650a, from the modified software library 608. Typically a library will include specific routines that will initialize the library for use. These routines could be identified as part of the base software library 604 that produces library A 650a. When the configurable settings module 616 receives the request to include initialization of library A 650a, it can query the base software library 604 that creates library A 650a and request the name of the initialization routine. This routine name is then included in the modification data 618. Alternatively, the base software library 604 for library A 650a could include a list of other modification data 618 that should be applied.

Creation of this new code could be initiated by the system 600 or could be initiated in response to user input. For example, user input could specify that libraries of a specific type be initialized, specific libraries be initialized, or libraries found on a specified storage device or in a specific subdirectory be initialized.

In the illustrated scenario, two external libraries, library A 650a and library B 650b, are accessible. Thus, the external libraries 650 may be on the same storage device as the system 600 or may be accessible by a network or other electronic communication channel.

Thereafter, the configurable settings component 616 creates programming code for initializing external library A 650a. This programming code is incorporated into modification data 618. The modification data 618 further includes an insertion point in the form of a line number. The insertion point could have been specified by a user or could have been determined or identified by the configurable settings component 616.

In the disclosed embodiment, the configurable settings component 616 thus creates entirely new code 640b that was not present in the base software library 604 or expressly provided by the user.

The embodiment shown in FIG. 6 is merely illustrative of one of the ways for providing newly created programming code to the modified software library 608. The configurable settings component 616 may be embodied in many different ways to create different types of programming code based on the configuration of the base software library 604 or the types of libraries that are accessible or other factors. For example, the addition of code segments 640, or other libraries, to the modified software library 608 may trigger modifications of other code segments 340 or libraries. For example, including a library for debugging support could trigger other libraries or code segments 640 to modify themselves to include debugging support. Likewise, if the debugging support module is removed, then the debugging support is automatically removed from other libraries or code segments 640.

As indicated above, the illustrations of various systems shown in FIGS. 3-6 are not limiting of the disclosed invention. Instead, they are intended to provide illustrations of the flexibility and power of the disclosed systems and methods. Many different types of modifications or transformations of the base programming library to a new or modified programming library come within the scope of the disclosed systems and methods. It is one of the foremost features of this invention that many different types of transformations may be utilized such that the modified programming library can be customized to a particular programming scenario.

Figure 7:
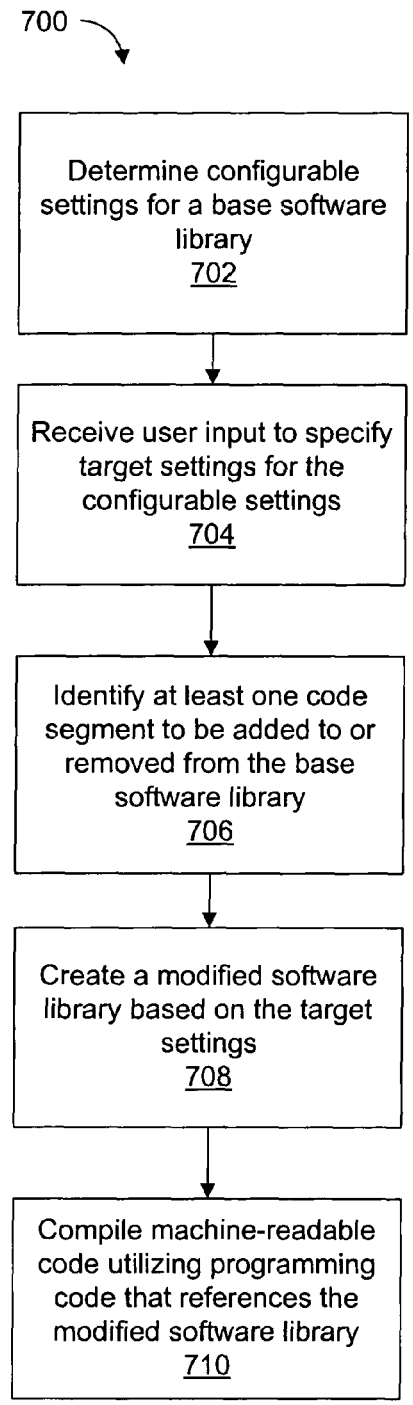
FIG. 7 is a flow diagram illustrating one embodiment of a method for providing a configurable software library.

FIG. 7 is a flow diagram illustrating one embodiment of a method 700 for providing a configurable software library 604. The configurable settings for a base software library 604 are first determined 702. The settings may be determined 702 in various ways. For example, a database or other data compilation, either external or internal to the base software library, may include such settings and may be retrieved to make such a determination 702. Alternatively, the configurable settings may be determined 702 by analyzing, for example, metadata, tags, switches, or keywords within the base software library.

As explained above, the base software library 604 may include human- or machine-readable programming code. The base software library may be derived from a first software library 222 (shown in FIG. 2) and may be embodied, for example, as a dynamic link library.

User input is then received 704 to specify target settings 614 for the configurable settings of the base software library. The user input may be received utilizing one or more of a host of user input systems. For example, the configurable settings may be displayed on a screen and user input may be received via a keyboard, trackball, touch-sensitive screen, or mouse. As an additional example, voice recognition commands may be utilized to generate user input.

At least one code segment to be added to or removed from the base software library is identified 706. A code segment to be added could be generated utilizing a configurable settings component or could be provided by a user, as illustrated in connection with FIGS. 5 and 6. A code segment could be deleted as illustrated in connection with FIGS. 3 and 4. Of course, user input may specify both the addition of certain code segments and deletion of other code segments. As used herein, the term "code segments" is not limited to programming code but may include comments or other textual material within the base software library.

Thereafter, a modified software library is created 708 by altering the base software library in accordance with the target settings. The modified software library 608 is created by a computer program in an automated manner, i.e., following receipt of user input no further user intervention is required to create the modified software library 608.

As explained in connection with FIGS. 1 and 2, machine-readable code 234 may be compiled 710 utilizing programming code (i.e., source code) that references the modified software library.

Figure 8:
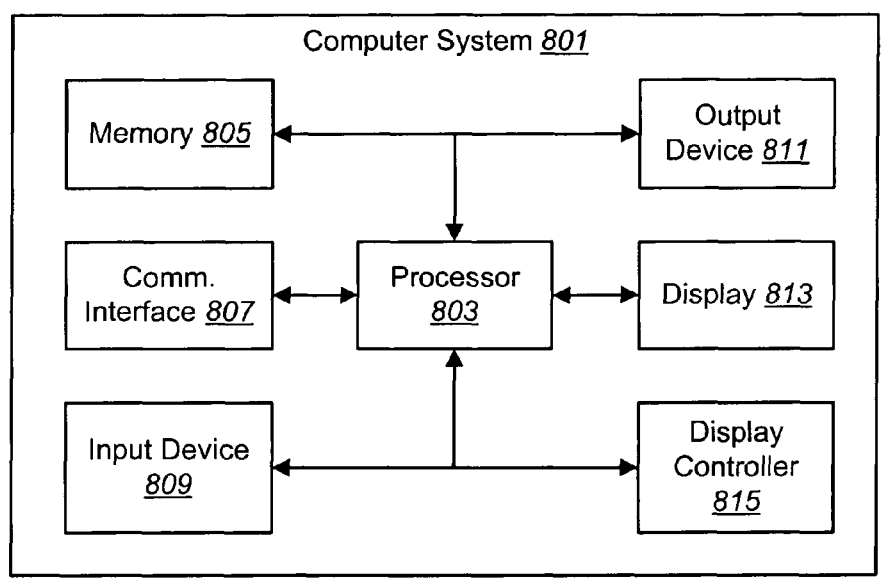
FIG. 8 is a block diagram illustrating the major hardware components typically utilized in a computer system.

FIG. 8 is a block diagram illustrating the major hardware components typically utilized in a computer system 801. The illustrated components may be located within the same physical structure or in separate housings or structures.

The computer system 801 includes a processor 803 and memory 805. The processor 803 controls the operation of the computer system 801 and may be embodied as a microprocessor, a microcontroller, a digital signal processor (DSP) or other device known in the art. The processor 803 typically performs logical and arithmetic operations based on program instructions stored within the memory 805.

As used herein, the term memory 805 is broadly defined as any electronic component capable of storing electronic information, and may be embodied as read only memory (ROM), random access memory (RAM), magnetic disk storage media, optical storage media, flash memory devices in RAM, on-board memory included with the processor 803, EPROM memory, EEPROM memory, registers, etc. The memory 805 typically stores program instructions and other types of data. The program instructions may be executed by the processor 803 to implement some or all of the methods disclosed herein.

The computer system 801 typically also includes one or more communication interfaces 807 for communicating with other electronic devices. The communication interfaces 807 may be based on wired communication technology, wireless communication technology, or both. Examples of different types of communication interfaces 807 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computer system 801 typically also includes one or more input devices 809 and one or more output devices 811. Examples of different kinds of input devices 809 include a keyboard, mouse, microphone, remote control device, button, joystick, trackball, touchpad, lightpen, etc. Examples of different kinds of output devices 811 include a speaker, printer, etc. One specific type of output device which is typically included in a computer system is a display device 813. Display devices 813 used with embodiments disclosed herein may utilize any suitable image projection technology, such as a cathode ray tube (CRT), liquid crystal display (LCD), light-emitting diode (LED), gas plasma, electroluminescence, or the like. A display controller 815 may also be provided, for converting data stored in the memory 805 into text, graphics, and/or moving images (as appropriate) shown on the display device 813.

Of course, FIG. 8 illustrates only one possible configuration of a computer system 801. Various other architectures and components may be utilized.

The computer system 801 may be embodied in various ways, such as a personal computer, laptop computer, server, tablet PC, or embedded device. The computer system 801 working in conjunction with software or embedded programming may be utilized to perform the systems and methods disclosed herein.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, components, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for providing a configurable software library comprising:

receiving user input to specify a target setting for at least one configurable setting of a base software library along with a desired target language for comments, the base software library being designed to be configurable and comprising human-readable programming code, wherein the configurable settings of the base software library control a number of allowable communication sockets for the software to be created;

identifying at least one code segment to be added to or removed from the base software library based on the target setting and the desired target language for the comments, wherein identifying the at least one code segment comprises identifying an exact location of the code segment that is to be removed;

creating a modified software library by altering the base software library in accordance with the target settings in an automated manner utilizing a computer program, wherein the altering comprises removing a code segment at the exact location such that the base software library includes a first code segment that is not included in the modified software library, wherein the modified software library comprises human-readable programming code and the comments and/or the programming code in the modified software library are in the desired target language, wherein the base and modified software libraries comprise programming code for an embedded device; and compiling machine-readable code utilizing programming code that references the modified software library.

2. The method of claim 1, further comprising determining the configurable settings of the base software library.

3. The method of claim 1, wherein the base software library is derived from a first software library.

4. The method of claim 1, wherein the target setting is configured to add at least one code segment to the base software library to create the modified software library.

5. The method of claim 4, wherein the added code segment comprises a call to an external software library.

6. The method of claim 4, wherein the added code segment defines constants for use in the modified software library.

7. The method of claim 1, further comprising:
linking the modified software library to compiled programming code that references the modified software library.

8. The method of claim 1, wherein the at least one code segment to be added or removed from the base software library comprises an algorithm.

9. The method of claim 1, wherein the at least one code segment to be added or removed from the base software library comprises programming code for initializing an external software library.

10. A computer system that is configured to provide a configurable software library, the computer system comprising:
a processor;
memory in electronic communication with the processor;
instructions stored in the memory, the instructions being executable to:
receive user input to specify a target setting for at least one configurable setting of a base software library along with a desired target language for comments, the base software library being designed to be configurable, wherein the configurable settings of the base software library control a number of allowable communication sockets for the software to be created;
identify at least one code segment to be added to or removed from the base software library based on the target setting and the desired target language for the comments, wherein identifying the at least one code segment comprises identifying an exact location of the code segment that is to be removed;
create a modified software library by altering the base software library in accordance with the target settings in an automated manner utilizing a computer program, wherein the altering comprises removing a code segment at the exact location such that the base software library includes a first code segment that is not included in the modified software library, wherein the comments and/or programming code in the modified software library are in the desired target language, wherein the base and modified software libraries comprise programming code for an embedded device; and
compiling machine-readable code utilizing programming code that references the modified software library.

11. The system of claim 10, wherein the base software library is derived from a first software library.

12. The system of claim 10, wherein the target setting is configured to add at least one code segment to the base software library to create the modified software library.

13. The system of claim 12, wherein the added code segment comprises a call to an external software library.

14. The system of claim 10, wherein the base and the modified software libraries comprise human-readable programming code.

15. A non-transitory computer-readable medium comprising executable instructions, the instructions being executable to:
receive user input to specify a target setting for at least one configurable setting of a base software library along with a desired target language for comments, the base software library being designed to be configurable, wherein the configurable settings of the base software library control a number of allowable communication sockets for the software to be created;
identify at least one code segment to be added to or removed from the base software library based on the target setting and the desired target language for the comments, wherein identifying the at least one code segment comprises identifying an exact location of the code segment that is to be removed;
create a modified software library by altering the base software library in accordance with the target settings in an automated manner utilizing a computer program, wherein the altering comprises removing a code segment at the exact location such that the base software library includes a first code segment that is not included in the modified software library, wherein the comments and/or programming code in the modified software library are in the desired target language, wherein the base and modified software libraries comprise programming code for an embedded device; and
compiling machine-readable code utilizing programming code that references the modified software library.

16. The non-transitory computer-readable medium of claim 15, wherein the base software library is derived from a first library.

17. The non-transitory computer-readable medium of claim 15, wherein the base and the modified software libraries comprise human-readable programming code.

18. The non-transitory computer-readable medium of claim 15, wherein the target setting is configured to add at least one code segment to the base software library to create the modified software library.

* * * * *